United States Patent
Cho et al.

(10) Patent No.: US 10,605,345 B2
(45) Date of Patent: Mar. 31, 2020

(54) DEVICE FOR TORQUE VECTORING

(71) Applicants: Hyundai Motor Company, Seoul (KR); Kia Motors Corporation, Seoul (KR)

(72) Inventors: Hyun Jae Cho, Gyunggi-Do (KR); Tae Sic Park, Gyunggi-Do (KR); Ok Ju Cho, Gyunggi-Do (KR); Seongeun Park, Whasung-Si (KR); KwangMin Choi, Whasung-Si (KR); Jun Hoi Huh, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 36 days.

(21) Appl. No.: 16/177,025

(22) Filed: Oct. 31, 2018

(65) Prior Publication Data

US 2019/0178361 A1 Jun. 13, 2019

(30) Foreign Application Priority Data

Dec. 11, 2017 (KR) .......................... 10-2017-0169585

(51) Int. Cl.
  *F16H 48/36* (2012.01)
(52) U.S. Cl.
  CPC ....... *F16H 48/36* (2013.01); *F16H 2048/368* (2013.01)
(58) Field of Classification Search
  None
  See application file for complete search history.

(56) References Cited

U.S. PATENT DOCUMENTS

| | | | |
|---|---|---|---|
| 2015/0057122 A1* | 2/2015 | Smetana | B60K 1/00 475/152 |
| 2015/0151634 A1* | 6/2015 | Smetana | B60K 1/02 475/150 |
| 2015/0152947 A1* | 6/2015 | Smetana | F16H 48/36 475/5 |
| 2016/0318419 A1* | 11/2016 | Gavling | B60L 15/025 |
| 2017/0313172 A1* | 11/2017 | Meixner | B60K 6/365 |

* cited by examiner

*Primary Examiner* — Justin Holmes
(74) *Attorney, Agent, or Firm* — Morgan, Lewis & Bockius LLP

(57) ABSTRACT

A torque vectoring apparatus may include a first planetary gear set including first to third rotation elements, wherein the first rotation element is gear-connected to receive power from the speed reduction device, the second rotation element is connected to be configured for transmitting power to the differential, and the third rotation element is selectively connectable to a housing through a coupling element; a second planetary gear set including fourth, fifth, and sixth rotation elements, wherein the fifth rotation element is fixedly connected to the third rotation element; and a third planetary gear set including seventh, eighth, and ninth rotation elements, wherein the seventh rotation element is fixedly connected to the fourth rotation element, the eighth rotation element is fixedly connected to one of the left and right output shafts while being fixedly connected to the sixth rotation element, and the ninth rotation element is fixedly connected to the housing.

6 Claims, 2 Drawing Sheets

Straight driving
(A)

Left turn
(B)

Right turn
(C)

DEVICE FOR TORQUE VECTORING

CROSS-REFERENCE TO RELATED APPLICATION

The present application claims priority to Korean Patent Application No. 10-2017-0169585 filed on Dec. 11, 2017, the entire contents of which is incorporated herein for all purposes by this reference.

BACKGROUND OF THE INVENTION

Field of the Invention

The present invention relates to a torque vectoring apparatus. More particularly, the present invention relates to a torque vectoring apparatus which is applied to a high-performance environmental vehicle such as a 1 motor e-AWD (All Wheel Drive) and the like to improve turning performance.

Description of Related Art

In general, a torque vectoring apparatus is a device that can independently and freely control torque transmitted to left and right wheels to improve agility and handing performance of a vehicle.

Here, the term "torque vectoring" refers to the magnitude and a direction of an output or driving torque of an engine transmitted to wheels from a vehicle, and implies a technology for changing the magnitude and direction of the torque transmitted to the wheels, and in particular, the torque transmitted to both wheels on the same axle axis.

That is, the torque vectoring differentiates the magnitude and direction of torque transmitted to both wheels, and is applied as an additional function to a differential which varies a torque ratio of torque distributed to the left and right wheels depending on a load applied to the wheels.

The torque vectoring apparatus configured for such a function actively controls a function of the differential to apply a driving intention of a driver such that a torque ratio divided into the left and right wheels may be controlled.

Accordingly, the driver can more actively utilize a driving torque and can expect improvement of handling characteristics.

However, it is not easy to implement it technically because the torque vectoring apparatus needs to be configured for delivering an appropriate level of torque to a required wheel as needed, while maintaining basic functions of the differential.

Recently, as electric vehicle technology that can more accurately implement torque vectoring according to alignment and control of a motor than a driving system using an internal combustion engine has been developed, the research and development of the torque vectoring apparatus is actively proceeding. In particular, with progress of high performance of environmental vehicles, research and development as element technology for improving turning performance of a high performance environmental vehicle have been actively applied to a rear differential of an AWD (All Wheel Drive) vehicle such as an electric vehicle (EV).

In a case of such an environmental vehicle, unlike a conventional internal combustion engine vehicle, a mechanical element such as a transfer shaft is not required. In the ease of a two-motor e-AWD and electric vehicle, torque vectoring may be implemented by applying motor control technology. However, in the case of 1-motor B-AWD, it is required to develop various torque vectoring technologies for achieving improvement of turning performance by optimizing rear wheel power distribution.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a high-performance environment vehicle such as a 1-motor e-AWD (All Wheel Drive) vehicle to minimize torque loss, improving fuel economy performance and turning performance.

Furthermore, the torque vectoring apparatus according to the exemplary embodiment of the present invention is directed to providing a torque vectoring apparatus that can maintain durability of a device source and reduce power loss by disconnecting a power connection state of the drive source through a speed reduction device.

Furthermore, the torque vectoring apparatus according to the exemplary embodiment of the present invention can minimize the loss of operation oil by inhibiting operation when the torque vectoring function such as turning is required by applying one coupling element to the torque vectoring apparatus, and the coupling element is released or applied only when straight traveling or when torque vectoring control is unnecessary and thus it is advantageous in terms of control and efficiency.

A torque vectoring apparatus according to one or a plurality of exemplary embodiments of the present invention utilizes a motor/generator as a power source and may include a speed reduction device reducing rotational power of the motor/generator, a differential that transmits rotational power transmitted from the speed reduction device while absorbing a rotation speed difference between left and right wheels, and a torque vectoring apparatus that adjust a torque ratio of torque distributed to the left wheel and the right wheel, and is disposed on left and right output shafts that are power-connected to the differential. The torque vectoring apparatus may include: a first planetary gear set that may include first, second, and third rotation elements, wherein the first rotation element is gear-connected to receive power from the speed reduction device, the second rotation element is connected to be configured for transmitting power to the differential, and the third rotation element is selectively connectable to a housing through a coupling element; a second planetary gear set that may include fourth, fifth, and sixth rotation elements, wherein the fifth rotation element is fixedly connected to the third rotation element; and a third planetary gear set that may include seventh, eighth, and ninth rotation elements, wherein the seventh rotation element is fixedly connected to the fourth rotation element, the eighth rotation element is fixedly connected to one of the left and right output shafts while being fixedly connected to the sixth rotation element, and the ninth rotation element is fixedly connected to the housing.

The coupling element may be formed of a brake which is provided between the third rotation element and the housing and may operate the third rotation element as a selective fixing element.

The first planetary gear set may be formed of a single pinion planetary gear set and thus the first, second, and third rotation elements are respectively provided as a first linear gear, a first planet carrier, and a first ring gear, the second planetary gear set may be formed of a single pinion planetary gear set and thus the fourth, fifth, and sixth rotation elements are respectively provided as a second linear gear, a second planet carrier, and a second ring gear, and the third planetary gear set may be formed of a single pinion planetary gear set and thus the seventh, eighth, and ninth rotation elements are respectively provided as a third linear gear, a third planet carrier, and a third ring gear.

The speed reduction device may include: a driving gear which is connected to a rotor of the motor/generator through a hub; a driven gear formed in the first rotation element of the torque vectoring apparatus; and an idle gear device configured formed for power transmission through an idle shaft between the driving gear and the driven gear the motor/generator to reduce rotational power of the motor/generator and transmit the reduced rotational power to the torque vectoring apparatus.

Here, the idle gear device may include: an idle shaft which is disposed parallel with the left and right output shafts; an idle input gear which is provided on the idle shaft and externally gear-connected to the driving gear; and an idle output gear which is fixedly connected on the idle shaft and externally gear-connected to the driven gear.

The idle gear device may further include a synchronizer which is provided between the idle input gear and the idle shaft for selective synchronization of the idle input gear with the idle shaft while disposing the idle input gear to be rotatable on the idle shaft.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
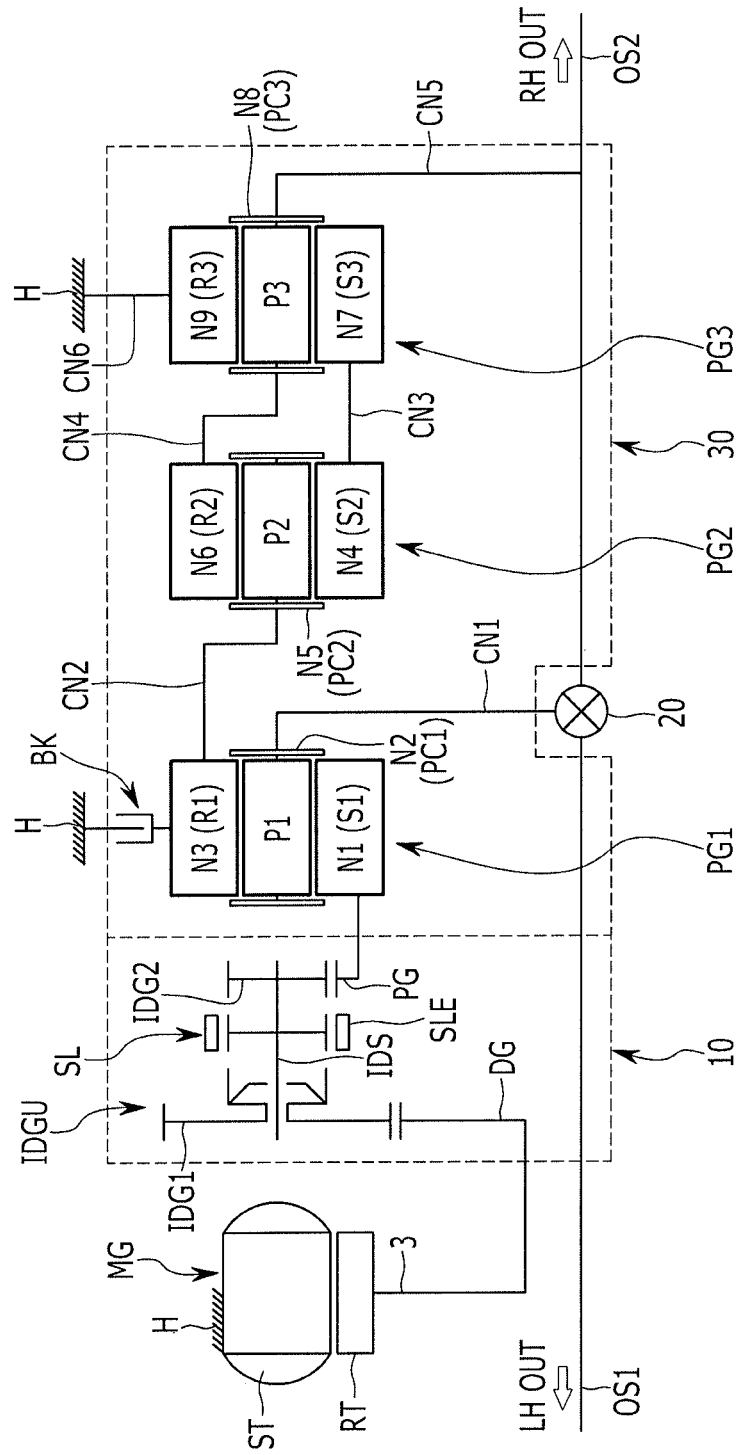
FIG. 1 is a schematic diagram of a torque vectoring apparatus according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

To clarify the present invention, parts that are not connected to the description will be omitted, and the same elements or equivalents are referred to with the same reference numerals throughout the specification.

In the following detailed description, the reason why terms such as first and second are used is to distinguish between elements because the first and the second elements respectively have the same constructions, and thus the elements are not limited to such order in the following description.

FIG. 1 is a schematic diagram of a torque vectoring apparatus according to an exemplary embodiment of the present invention.

Referring to FIG. 1, a torque vectoring apparatus according to an exemplary embodiment of the present invention is formed of a speed reduction device 10 disposed on each of left and right output shafts OS1 and OS2, a differential 20, and a torque vectoring apparatus 30, together with a motor/generator (MG), which is a driving source.

That is, the torque vectoring apparatus reduces rotational power of the motor/generator MG in the speed reduction device 10 and transmits the reduced torque to the torque vectoring apparatus 30, and the torque vectoring apparatus 30 transmits the received torque to the differential 20.

As such, the differential 20 transmits rotational power transmitted from the torque vectoring apparatus 30 to left and right wheels while absorbing a speed difference between the left and right wheels.

In the instant case, the torque vectoring apparatus 30 improves driving performance such as turning performance and the like by adjusting a torque ratio divided into the left wheel and the right wheel according to driving conditions such as turning performance and the like.

The left and right output shafts OS1 and OS2 are power transmission shafts provided between the differential 20 and the left and right wheels, and may imply typical left and right driveshafts.

The motor/generator MG is formed of a stator ST fixed to one side of a housing H and a rotor RT power-connected to the speed reduction device 10, and may simultaneously perform a function of a motor that supplies rotational power to the speed reduction device 10 and of a generator that generates electricity while rotating by the torque transmitted from the left and right wheels.

The speed reduction device 10 reduces rotational power transmitted from the motor/generator MG and transmits the reduced torque to the torque vectoring apparatus 30.

The speed reduction device 10 includes a drive gear DG, a driven gear PG, and an idle gear device IDGU. That is, rotational power of the motor/generator MG, transmitted through the drive gear DG is reduced through the idle gear device IDGU and the reduced torque is transmitted to the torque vectoring apparatus 30 through the driven gear PG.

The drive gear DG is connected to the rotor RT of the motor/generator MG in a fixed manner through a hub 3.

The driven gear PG is formed on one rotation element of the torque vectoring apparatus 30, and transmits rotational power of the motor/generator MG to the torque vectoring apparatus 30.

The idle gear device IDGU reduces the rotation power of the motor/generator MG through two idle gears that are provided on an idle shaft IDS to transmit power between the drive gear DG and the driven gear PG, and transmits the reduced rotational power to the torque vectoring apparatus 30.

That is, the idle shaft IDS is disposed parallel with the left and right output shafts OS1 and OS2.

The two idle gears provided on the idle shaft IDS are formed as an idle input gear IDG1 and an idle output gear IDG2.

The idle input gear IDG1 is provided on the idle shaft IDS and is external-gear-connected to the drive gear DG.

The idle output gear IDG2 is fixedly connected to the idle shaft IDS and is external-gear-connected to the driven gear PG.

In the instant case, the idle gear device IDGU selectively synchronizes the idle input gear IDG1 to the idle shaft IDS by forming a synchronizer SL on the idle shaft IDS to connect or disconnect rotational power of the motor/generator MG, transmitted to the torque vectoring apparatus 30.

That is, the synchronizer SL is disposed between the idle input gear IDG1 and the idle shaft IDS to selectively synchronize the idle input gear IDG1 to the idle shaft IDS while forming the idle input gear IDG1 to be rotatable about the idle shaft IDS.

Here, since the synchronizer SL is a known component, no further detailed description will be provided, and a sleeve SLE applied to the synchronizer SL is provided with an additional actuator or as is known, and the actuator may be controlled by a control device.

Meanwhile, the differential 20 may be provided as a typical differential that transmits rotational power transmitted from the torque vectoring apparatus 30 to the left and right output shafts OS1 and OS2 while absorbing a rotation speed difference between the left wheel and the right wheel.

The torque vectoring apparatus 30 is provided to adjust a torque ratio divided to the left and right wheels, and is formed of a combination of three planetary gear sets PG1, PG2, and PG3.

The three planetary gear sets PG1, PG2, and PG3 are formed of a first planetary gear set PG1, a second planetary gear set PG2, and a third planetary gear set PG3 that are disposed in parallel with each other at the right side of the speed reduction device 10, and one rotation element of the first planetary gear set PG1 operates as a selective fixing element while being selectively connectable to a housing H through a brake BK, which is a coupling element.

The first planetary gear set PG1 is a single pinion planetary gear set that includes first, second, and third rotation elements N1, N2, and N3, and includes a first linear gear S1, which is the first rotation element N1, a first planet carrier PC1, which is the second rotation element N2 that supports a plurality of pinion gears P1 which are equispaced and radially outwardly engaged with an external circumferential side of the first linear gear P1 to be configured for rotation and revolution, and a first ring gear R1, which is the third rotation element N3 and is inwardly engaged with the plurality of first pinion gears P1 and thus power-connected to the first linear gear S1.

The second planetary gear set PG2 is a single pinion planetary gear set that includes fourth, fifth, and sixth rotation elements N4, N5, and N6, and includes a second linear gear S2, which is the fourth rotation element N4, a second planet carrier PC2, which is the fifth rotation element N5 that supports a plurality of second pinion gears P2 which are equispaced and radially outwardly engaged with an external circumferential side of the second linear gear S2 to be configured for rotation and revolution, and a second ring gear R2, which is the sixth rotation element N6 and is inwardly engaged with the plurality of second pinion gears N2 and thus power-connected to the second linear gear S2.

The third planetary gear set PG3 is a single pinion planetary gear set, and includes a third linear gear S3, which is a seventh rotation element N7, a third planet carrier PC3, which is an eight rotation element N8 and supports a plurality of pinion gears P3 which are equispaced and radially outwardly engaged with an external circumferential side of the third linear gear S3, and a third ring gear R3, which a ninth rotation element N9 which is inwardly engaged with the plurality of third pinion gears P3 and thus is power-connected to the third linear gear S3.

In an exemplary embodiment of the present invention, the first linear gear S1, second linear gear S2, and third linear gear S3 are a first sun gear, a second sun gear, and a third sun gear.

Here, the first rotation element N1 is outwardly engaged with the idle output gear IDG2 of the speed reduction device 10 through the driven gear PG, and receives speed-reduced rotational power of the motor/generator MG.

The second rotation element N2 is power-connected to the speed differential 20 through a first connection member CN1, and the third rotation element N3 is selectively connectable to the housing H through the brake BK, which is a coupling element, and thus is configured as a selective fixing element.

Furthermore, the third rotation element N3 is connected to the fifth rotation element N5 in a fixed manner through a second connection member CN2, the fourth rotation element N4 is fixedly connected to the seventh rotation element N7 through a third connection member CN3, and the sixth rotation element N6 is fixedly connected to the eighth rotation element N8 through a fourth connection member CN4.

Here, the eighth rotation element N8 is fixedly connected to the right-side output shaft OS2 through a fifth connection member CN5, and the ninth rotation element N9 is connected to the housing H in a fixed manner through a sixth connection member CN6.

The above-stated six connection members CN1 to CN6 may be rotation members that fixedly connect a plurality of rotation elements and transmit power while rotating together with the rotation members, rotation members that selectively connect the rotation elements with the housing H, or fixing members that directly connect and fix the rotation elements to the housing H among the rotation elements of the planetary gear sets PG1, PG2, and PG3.

Furthermore, the expression "fixedly connected" or a term similar thereto implies that the left and right output shafts OS1 and OS2 are included and a plurality of rotation elements and a corresponding connection member connected through the corresponding connection member rotate without a rotation speed difference. That is, the plurality of fixedly connected rotation elements and the corresponding connection member rotate in the same rotation direction with the same rotation speed.

Furthermore, in the above description, the expression "selectively connectable" or terms similar thereto implies that the left and right output shafts OS1 and OS2 are included and a plurality of rotation elements and a corresponding connection member connected through the corresponding connection member rotate without a rotation speed difference, or the corresponding connection member is fixed to the housing through the coupling element.

That is, when the coupling elements selectively connect the plurality of connection members, the coupling elements operate such that the plurality of connection members rotate in the same direction with the same rotation speed, and when the coupling elements are released, the connection of the plurality of connection members is disconnected.

In the above description, each coupling element formed of the brake BK may be provided as a hydraulic friction coupling device operated by hydraulic pressure supplied by a hydraulic control apparatus, and in general, a multi-plate wet hydraulic friction coupling device is used, but may be provided as a coupling device which may operate depending on electrical signals supplied from an electronic control apparatus, such as a dog clutch, an electronic clutch, a magnetic clutch, and the like.

Figure 2:
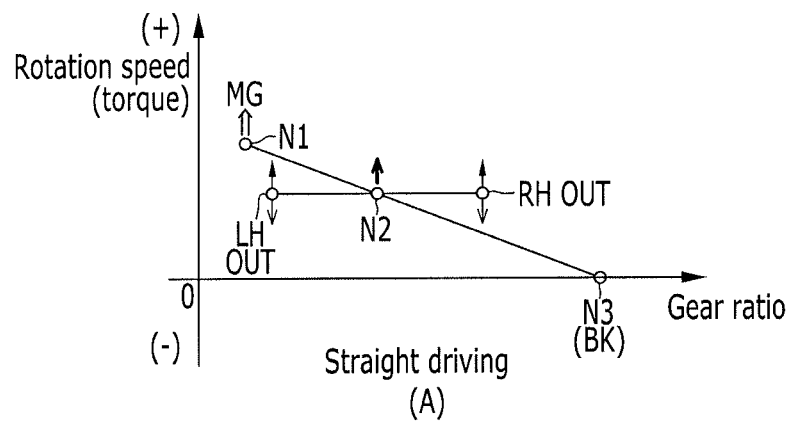
FIG. 2 is a lever diagram provided for description of torque vectoring operation of the torque vectoring apparatus according to the exemplary embodiment of the present invention.
Figure 2:
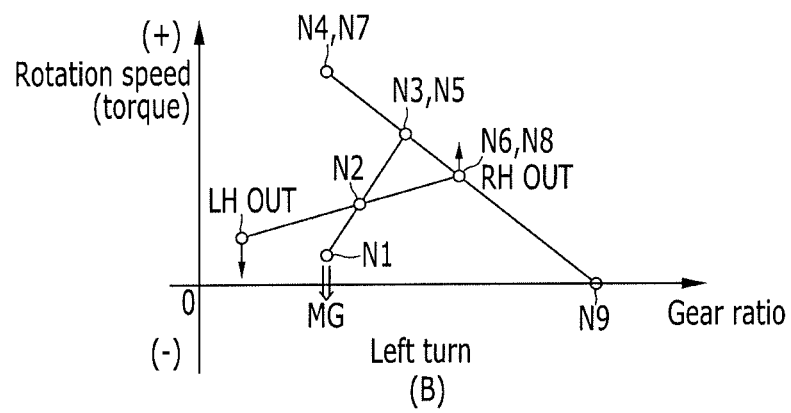
Figure 2:
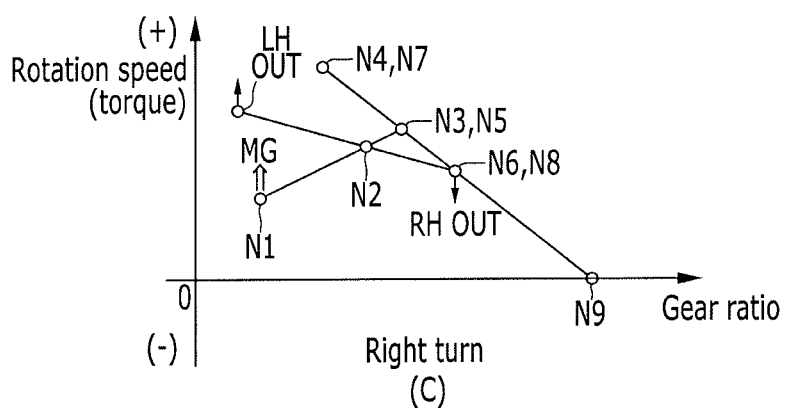

The torque vectoring apparatus 30 having such a configuration performs torque vectoring control with respect to torque transmitted to the left and right wheels according to selective control of the brake BK as shown in a lever diagram of FIG. 2.

FIG. 2 is a lever diagram provided for description of torque vectoring operation of the torque vectoring apparatus according to the exemplary embodiment of the present invention.

Referring to (A), (B), and (C) in FIG. 2, the torque vectoring apparatus according to the exemplary embodiment of the present invention controls a torque distribution ratio of torque transmitted to the left and right wheels by selectively controlling the brake BK and controlling torque of the motor/generator MG, which is a driving source, according to a driving condition such as straight running, left or right turning, and the like.

That is, referring to FIG. 2, the vertical axis denotes rotation speed of nine rotation elements N1 to N9 of the first, second, and third planetary gear sets PG1, PG2, and PG3 of the torque vectoring apparatus 30, and the horizontal axis denotes a gear ratio (number of gear teeth of linear gear/number of gear teeth of ring gear) of each of the rotation elements N1 to N9.

The vertical axis and the horizontal axis are known to a person in the field of the planetary gear train, and therefore no further detailed description will be provided.

Torque vectoring operation according to the driving condition of the torque vectoring apparatus will now be described with reference to the lever diagram of FIG. 2.

First, referring to FIG. 2, the third rotation element N3 is selectively connectable to the housing H through the brake BK, the ninth rotation element N6 is fixed to the housing H, and the first rotation element N1 receives rotational power which is reduced while passing through the speed rotation device 10.

[Straight Running]

Referring to (A) in FIG. 2, when the vehicle is in the straight running condition, the brake BK is controlled in an operation state.

As such, the third rotation element N3 is fixed to the housing H by operation of the brake BK and thus functions as a fixing element, and the second and third planetary gear sets PG2 and PG3 of the torque vectoring apparatus 30 do not affect rotation speed or torque distribution of the right output shaft OS2.

Accordingly, rotational power, which was reduced through the speed reduction device 10 and input to the first rotation element N1 of the first planetary gear set PG1 which is in the torque vectoring apparatus 30, from the motor/generator MG, equally acts on the left and right output shafts OS1 and OS2 with the same torque through the second rotation element N2, and in the instant case, torque is divided 50:50 to the left and right output shafts OS1 and OS2 such that the vehicle can perform straight running.

[Left Turn Traveling]

Referring to (B) in FIG. 2, when the vehicle is turning left, operation of the brake BK is released, and a torque of the motor/generator MG is controlled to be "−".

Accordingly, rotational power, which was reduced through the speed reduction device 10 and input to the first rotation element N1 of the first planetary gear set PG1 which is in the torque vectoring apparatus 30, from the motor/generator MG, is output to the left and right output shafts OS1 and OS2 through the second rotation element N2 such that the rotation speed and a torque of the eighth rotation element N8 connected to the right output shaft OS2 are increased.

When torque is distributed, the right output shaft OS2 that transmits the rotational power to the right wheel which is outside during the turn is distributed greater than the left output shaft OS1 to enable the left turn traveling.

[Right Turn Traveling]

Referring to (C) in FIG. 2, when the vehicle is turning right, operation of the brake BK is released, and a torque of the motor/generator MG is controlled to be "+".

Accordingly, rotational power, which was reduced through the speed reduction device 10 and input to the first rotation element N1 of the first planetary gear set PG1 which is in the torque vectoring apparatus 30, from the motor/generator MG, is output to the left and right output shafts OS1 and 0S2 through the second rotation element N2 such that the rotation speed and a torque of the eighth rotation element N8 connected to the right output shaft OS2 are decreased.

When torque is distributed, the left output shaft OS1 that transmits the rotational power to the left wheel which is outside during the turn is distributed greater than the right output shaft OS2 to enable the right turn traveling.

While driving, when the vehicle speed is increased and thus rotation speed of the motor/generator MG exceeds the maximum hardware-permissible RPM, rotational power of the motor/generator MG is disconnected by asynchronous operation of the synchronizer SL provided in the speed reduction device 10 such that the motor/generator MG may be operated without a load.

As described above, the torque vectoring apparatus according to the exemplary embodiment of the present invention is applied to a high-performance environmental vehicle such as a 1 motor e-AWD (All Wheel Drive) vehicle and the like to improve driving performing of the vehicle through torque vectoring according to a driving condition such as turning performance.

Furthermore, when the vehicle speed is increased and thus rotation speed of the motor/generator MG exceeds the maximum hardware-permissible RPM, the motor/generator MG may be operated without a load by asynchronous operation of the synchronizer SL such that durability of the motor/generator MG may be preserved, and rotational power of the motor/generator MG is disconnected to reduce unnecessary power consumption, improving fuel efficiency.

Furthermore, the rotational power disconnection function of the motor/generator MG may be effectively applied to disconnect rotational power of a driving motor in engine driving of a hybrid electric vehicle (HEV), a plug-in hybrid electric vehicle (PHEV), and the like.

Furthermore, it is possible to minimize the loss of operation oil by inhibiting operation when the torque vectoring function such as turning is required by applying one brake BK to the torque vectoring apparatus 30, and the brake BK is released or applied only when straight traveling or when torque vectoring control is unnecessary and thus it is advantageous in terms of control and efficiency.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A torque vectoring apparatus that utilizes a motor/generator as a power source and includes a speed reduction device reducing rotational power of the motor/generator, a differential that transmits rotational power transmitted from the speed reduction device while absorbing a rotation speed difference between first and second wheels, and a torque vectoring apparatus that adjust a torque ratio of torque distributed to the first wheel and the second wheel, and is disposed on first and second output shafts that connected to the differential, wherein the torque vectoring apparatus comprises:
a first planetary gear set that includes a first rotation element, a second rotation element engaged to the first rotation element, and a third rotation element engaged to the second rotation element, wherein the first rotation element is engaged to the speed reduction device to receive power from the speed reduction device, the second rotation element is engaged to the differential for transmitting power to the differential, and the third rotation element is selectively connectable to a housing through a coupling element;
a second planetary gear set that includes a fourth rotation element, a fifth rotation element engaged to the fourth rotation element, and a sixth rotation element engaged to the fifth rotation element, wherein the fifth rotation element is fixedly connected to the third rotation element; and
a third planetary gear set that includes a seventh rotation element, an eighth rotation element engaged to the seventh rotation element, and a ninth rotation element engaged to the eighth rotation element, wherein the seventh rotation element is fixedly connected to the fourth rotation element, the eighth rotation element is fixedly connected to one of the first and second output shafts while being fixedly connected to the sixth rotation element, and the ninth rotation element is fixedly connected to the housing.

2. The torque vectoring apparatus of claim 1, wherein the coupling element includes a brake which is mounted between the third rotation element and the housing and selectively connects the third rotation element to the housing.

3. The torque vectoring apparatus of claim 1, wherein the first planetary gear set includes a single pinion planetary gear set and the first rotation element, the second rotation element, and the third rotation element are provided as a first linear gear, a first planet carrier, and a first ring gear, respectively,
the second planetary gear set includes a single pinion planetary gear set and the fourth rotation element, the fifth rotation element, and the sixth rotation element are provided as a second linear gear, a second planet carrier, and a second ring gear, respectively, and
the third planetary gear set includes a single pinion planetary gear set and the seventh rotation element, the eighth rotation element, and the ninth rotation element are provided as a third linear gear, a third planet carrier, and a third ring gear, respectively.

4. The torque vectoring apparatus of claim 1, wherein the speed reduction device includes:
a driving gear which is connected to a rotor of the motor/generator through a hub;
a driven gear connected to the first rotation element of the torque vectoring apparatus; and
an idle gear device including an idle shaft and configured for transiting rotational power of the motor/generator through the idle shaft between the driving gear and the driven gear to reduce the rotational power of the motor/generator and to transmit the reduced rotational power to the torque vectoring apparatus.

5. The torque vectoring apparatus of claim 4, wherein the idle gear device includes:
the idle shaft which is disposed parallel with the first and second output shafts;
an idle input gear which is rotatably mounted on the idle shaft and engaged to the driving gear; and
an idle output gear which is fixedly connected on the idle shaft and engaged to the driven gear.

6. The torque vectoring apparatus of claim 5, wherein the idle gear device further includes a synchronizer which is mounted between the idle input gear and the idle shaft for selectively synchronizing of the idle input gear with the idle shaft.

* * * * *